US007196824B2

(12) United States Patent
Okawa (10) Patent No.: US 7,196,824 B2
(45) Date of Patent: Mar. 27, 2007

(54) CONFIDENTIAL FACSIMILE TRANSMISSION AND RECEIPT NOTIFICATION

(75) Inventor: Takuya Okawa, Mishima (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 828 days.

(21) Appl. No.: 10/279,099

(22) Filed: Oct. 24, 2002

(65) Prior Publication Data

US 2004/0080781 A1 Apr. 29, 2004

(51) Int. Cl.
*H04N 1/44* (2006.01)
*G06F 3/12* (2006.01)

(52) U.S. Cl. .................................... 358/402; 358/1.15

(58) Field of Classification Search .................... None
See application file for complete search history.

(56) References Cited

U.S. PATENT DOCUMENTS 5,790,639 A * 8/1998 Ranalli et al. ......... 379/100.08

| | | | |
|---|---|---|---|
| 2002/0118397 A1* | 8/2002 | Maruyama | 358/405 |
| 2002/0157028 A1* | 10/2002 | Koue et al. | 713/202 |
| 2003/0095289 A1* | 5/2003 | Mitani | 358/402 |
| 2003/0112472 A1* | 6/2003 | Eguchi et al. | 358/402 |
| 2003/0179408 A1* | 9/2003 | Kagawa | 358/1.18 |
| 2005/0036167 A1* | 2/2005 | Atsumi | 358/1.15 |
| 2005/0105139 A1* | 5/2005 | Atsumi | 358/400 |
| 2006/0066895 A1* | 3/2006 | Tonami et al. | 358/1.15 |

FOREIGN PATENT DOCUMENTS

| JP | 2000-175056 | 6/2000 |
|---|---|---|
| JP | 2001-45214 | 2/2001 |

* cited by examiner

*Primary Examiner*—Twyler Lamb
*Assistant Examiner*—Myles D. Robinson
(74) *Attorney, Agent, or Firm*—Foley & Lardner LLP (57) ABSTRACT

In an image processing apparatus of the present invention, an F code indicating a location in which facsimile data received from outside is stored, and a mail address of a computer apparatus connected to a network, associated with the F code, are set. If the facsimile data is received along with the F code, the apparatus creates and sends a receipt mail reporting to the mail address associated with the F code that the facsimile data has been received. The apparatus accepts a mail including instructions concerning processing on the received facsimile data, and processes the facsimile data in accordance with the instructions.

18 Claims, 7 Drawing Sheets

F code setting

Box number    1
Type    Confidential
Password    XXXXXXX

F I G. 6B

Address setting

Name    Shizuoka-ken
Postal address    Mishima-shi
   Minami-cho
Telephone number    0559-11-1111
Fax number    0559-22-2222
Mail address    AAA@xxxxxxx.co.jp
Management F code    1
Incoming contact priority order

FIG. 7

```
Mail address : AAA@xxxxxxx.xo.jp
CC :
Subject : FcodeNBR1 : FILE100
==========================
Fcode : Number : 1
Type : CONFIDENTIAL
PGS : 1
File Number : 100
Date : 30 August
Time : 14:00
From :
```

FIG. 8

```
Mail address : faxmachine@xxxxxxx.co.jp
CC :
Subject : Re : FcodeNBR1 : FILE100 : PWDXXXXXXXX : PRT
==================================================
----- Original Message -----
Fcode : faxmachine@xxxxxxx.co.jp
To : AAA@xxxxxxx.co.jp
Sent : Saturday, August, 01 16:10
Subject : FcodeNBR1 : FILE100

>Fcode : Number : 1
>Type : CONFIDENTIAL
>PGS : 1
>File Number : 100
>Date : 30 August
>Time : 14:00
>From :
```

FIG. 9

| CONTROL INSTRUCTIONS | CONTENTS |
|---|---|
| PRT | PRINT DESIRED RECEIVED FACSIMILE DATA HAVING FILE NUMBER IN F CODE |
| FWI | CONVERT DESIRED RECEIVED FACSIMILE DATA HAVING FILE NUMBER IN F CODE INTO TIF FORMAT, AFTER THAT, SEND IT AS ATTACHMENT FILE OF E-MAIL TO ADDRESS ENCLOSED WITH " " |
| FWF | TRANSFER TO FAX NUMBER ENCLOSED WITH " " |
| CNW | CONVERT DESIRED RECEIVED FACSIMILE DATA HAVING FILE NUMBER IN F CODE INTO TIF FORMAT. CONVERTED FILE IS STORED IN F CODE |
| DEL | DELETE DESIRED RECEIVED FACSIMILE DATA HAVING FILE NUMBER IN F CODE |
| LST | PRINT LIST OF DESIRED FACSIMILE DATA STORED IN BOX NUMBER IN F CODE |

FIG. 10

CONFIDENTIAL FACSIMILE TRANSMISSION AND RECEIPT NOTIFICATION

BACKGROUND OF THE INVENTION

1. Field of the Invention

The present invention relates to an image processing apparatus and an image processing method which perform predetermined processing on data received from outside via a network.

2. Description of the Related Art

In an office environment of recent years, networking of computers has progressed. Accordingly, sharing of resources other than computers is performed in certain office environments. In particular, input peripheral devices such as scanners, and output peripheral devices such as printers and facsimiles, are connected to an office network and used in common by many people within the office.

Such networking of peripheral devices allows sharing of information resources. At the same time, a method of making effective use of functions of peripheral devices on a network is important.

Previously, networked printers and facsimiles were used as separate peripheral devices. However, multifunctional units, having image processing functions of printers and facsimiles in a single housing have now become common. If such a multifunctional unit is connected to a network, a single peripheral device is shared between any number of people in an office environment. Thus, information security is also important, as well as information sharing.

In recent years, the types of multifunctional units having printer, facsimile, and copy functions presupposing that they are connected to networks have increased. Therefore, not only the printing function of a printer but also the function of a facsimile need to be adapted for use in a network environment. Conventionally, communication specifications as a facsimile function are strictly defined by international standards. In recent years, multifunctional units have been developed that support an internet facsimile function for transmitting facsimile data via the Internet, as attached data of an e-mail.

In a facsimile apparatus used in an office environment, an F code (mail box) function (hereinafter referred to as an "F code function") is known as a generally supported function. The F code function enables storage of received facsimile data in a preestablished F code. Thus, the F code function is outstanding in terms of security. However, even if facsimile data is stored in a desired F code from an outside line, reporting to the establisher of the F code is not performed. Specifically, even if the establisher of the F code receives facsimile data, he/she cannot be informed of when reception is completed.

Facsimile apparatuses have a function of printing an F code establishment status, presence/absence of facsimile data in the established F code, and data amount, etc. However, the F code establisher actively requires the facsimile apparatus to perform printing. Therefore, even if the apparatus has such a function, the F code establisher cannot know when the facsimile data is received in his/her F code.

Further, when a facsimile apparatus is connected to a network, it is assumed that the facsimile apparatus is shared by any number of people. Thus, as for the F code function mainly used for security purposes in a facsimile apparatus, a method of regularly printing an F code status cannot be adopted.

BRIEF SUMMARY OF THE INVENTION

The object of the present invention is to provide an image processing apparatus and an image processing method which hold confidentiality concerning an F code function for storing, in a preestablished F code, data received via a network from outside, while improving the convenience.

An image processing apparatus according to an embodiment of the present invention comprises a setting section which sets an F code indicating a location in which facsimile data received from outside is stored, and a mail address of a computer apparatus connected to a network, associated with the F code; a receiving section which receives the facsimile data along with the F code; a receipt mail creating section which creates, if the facsimile data is received along with the F code, a receipt mail reporting to the mail address associated with the F code that the facsimile data has been received; and a processing section which, if a mail including instructions concerning processing on the received facsimile data is accepted with respect to the receipt mail, processes the facsimile data in accordance with the instructions.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment wherein an image processing apparatus of the present invention is applied to a digital multifunction unit will be explained with reference to the drawings.

Figure 1:
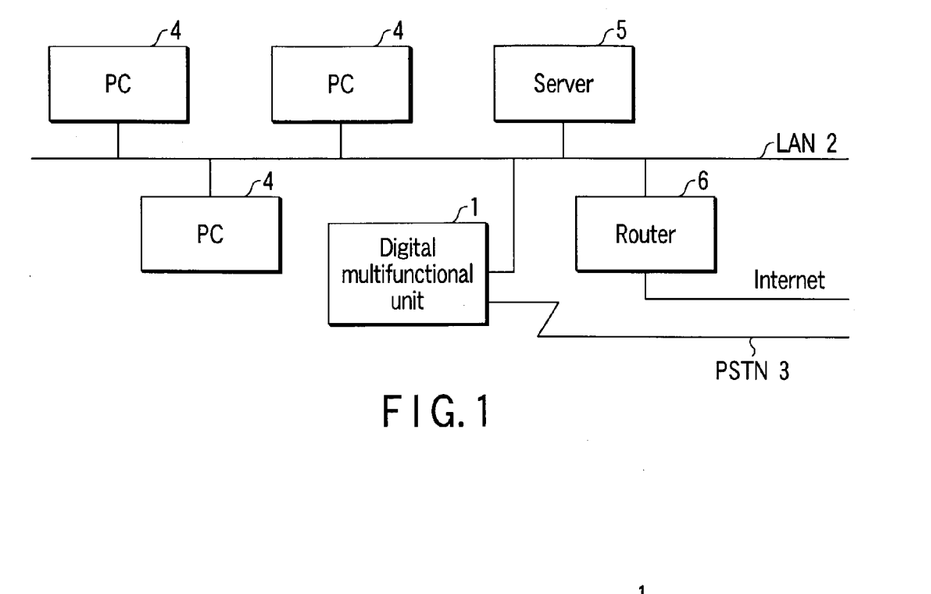
FIG. 1 shows a network configuration according to an embodiment of the present invention.

FIG. 1 shows a network configuration to which the digital multifunction unit is connected. The digital multifunction unit 1 is connected to a local area network (LAN) 2 and a Public Switched Telephone network (PSTN) 3. The LAN 2 is connected to a plurality of personal computers (PCs) 4, a server 5, and a router 6. The router 6 is connectable to the Internet.

The server 5 is a mail server which manages an e-mail function service. The server 5 implements e-mail transmission/reception between the PCs 4 connected to the LAN 2, according to each protocol of TCP/IP, SMTP, and POP3, on the basis of the information such as an IP address, account, etc.

An e-mail to be transmitted outside the LAN 2 is transmitted from the server 5 via the router 6 to the Internet. An e-mail to be received outside the LAN 2 is received through the reverse path. The transmission/reception procedures concerning e-mails is stipulated in a technical document, Request For Comments (RFC) by the Internet Engineering Take Force (IETF). The above procedures apply not only to the PCs connected via the server 5 but also to the digital multifunction unit capable of being connected to the network.

Figure 2:
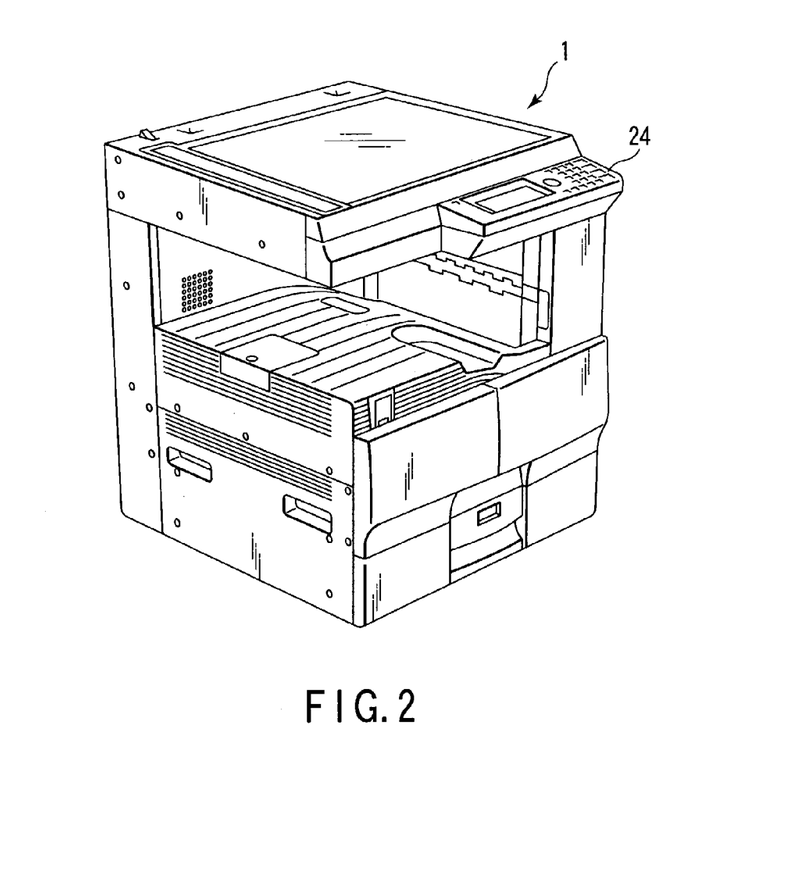
FIG. 2 shows an appearance of a digital multifunctional unit.
Figure 3:
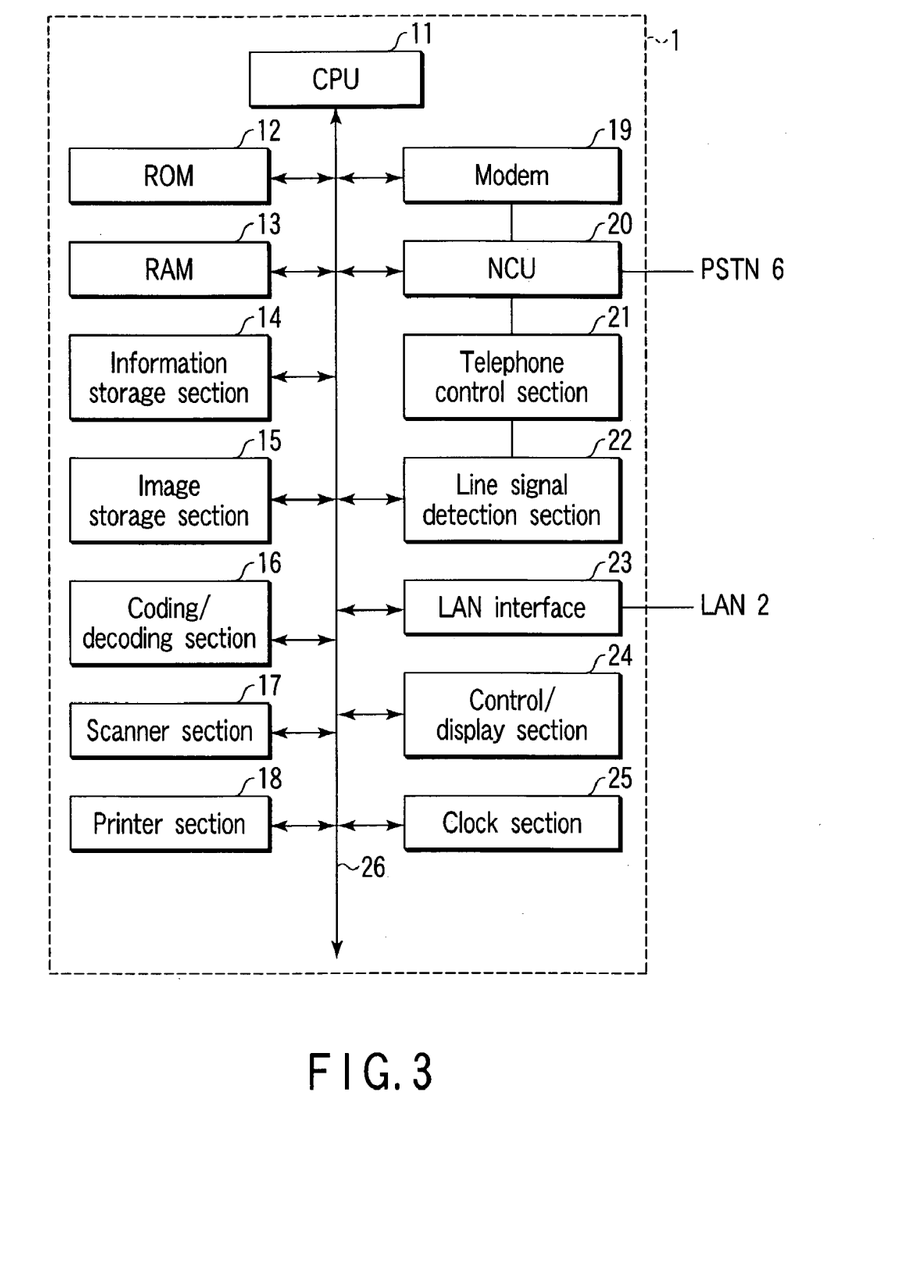
FIG. 3 is a block diagram showing a main structure of the digital multifunctional unit.

FIG. 2 shows an appearance of the digital multifunction unit 1, and FIG. 3 is a block diagram showing a main structure of the digital multifunction unit.

The digital multifunction unit 1 mainly comprises a CPU 11, a ROM 12, a RAM 13, an information storage section 14, an image storage section 15, a coding/decoding section 16, a scanner section 17, a printer section 18, a modem 19, an NCU 20, a telephone control section 21, a line signal detection section 22, a LAN interface 23, a control/display section 24, and a clock section 25.

The CPU 11, ROM 12, RAM 13, information storage section 14, image storage section 15, coding/decoding section 16, scanner section 17, printer section 18, modem 19, NCU 20, line signal detection section 22, LAN interface 23, control/display section 24, and clock section 25 are connected to each other via a bus line 26. The NCU 20 is connected to the modem 19 and the telephone control section 21. The telephone control section 21 is connected to the line signal detection section 22.

The CPU 11 implements an operation as a digital multifunction unit by performing control processing for generally controlling each section based on a control program stored in the ROM 12.

The ROM 12 stores the control program of the CPU 11, etc.

The RAM 13 is used as a work area, etc., for storing various information items necessary for the CPU 11 to carry out processing.

The information storage section 14 comprises a nonvolatile memory, for example, and stores various setting information items and other information items. A part of the storage area of the information storage section 14 is provided with an area which stores the settings of the F code and the addresses of the PCs 4, etc., connected to the LAN 2.

Figure 4:
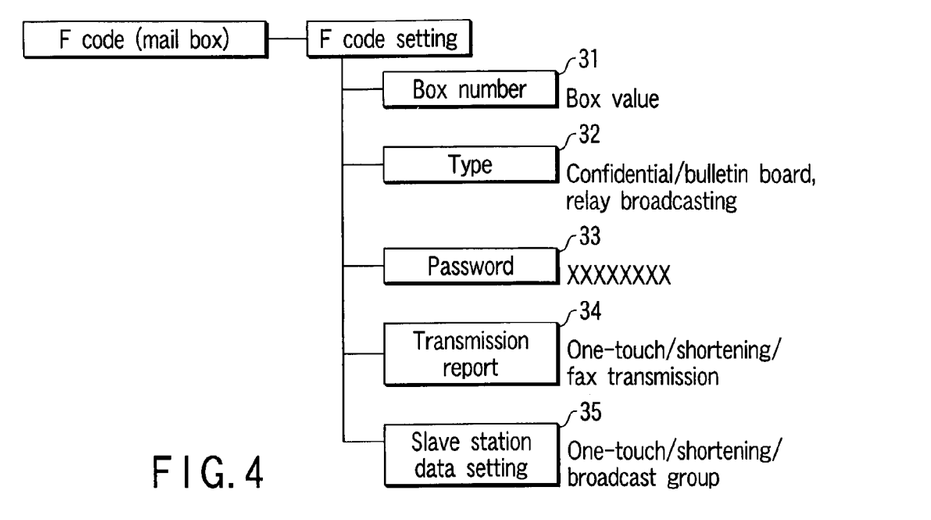
FIG. 4 shows an F code setting.

With respect to the setting of an F code (mail box), as shown in FIG. 4, each item of a box number 31, a type 32, a password 33 as encryption information, a transmission report 34, and a slave station data setting 35 is set. As the box number 31, a predetermined box value is set. As the type 32, any of a confidential, bulletin board and relay broadcasting is set. As the password 33, an arbitrary alphanumeric character is set. As the transmission report 34, any of a one-touch, shortening, and facsimile transmission is set. As the slave station data setting 35, any of a one-touch, shortening, and broadcast group is set. Of the F code setting items, the box number 31, the type 32 and the password 33 are setting conditions required at the time of establishing the F code. With respect to the items which are not conditions required for establishing the F code, the default condition is applied unless the user performs input.

Figure 5:
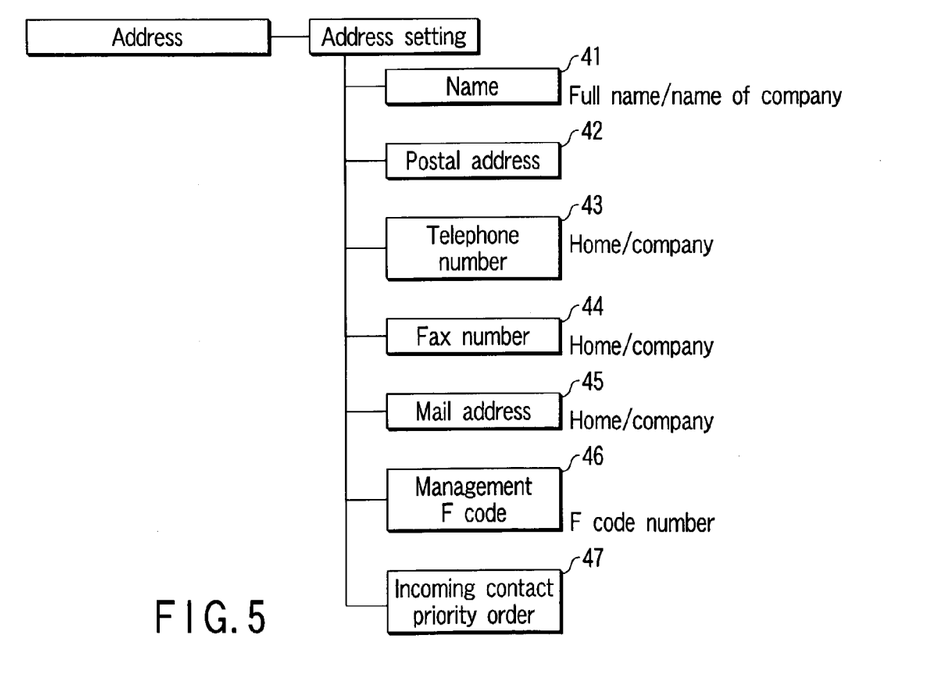
FIG. 5 shows an address setting.

With respect to the setting of a mail address, as shown in FIG. 5, items of a name 41, a postal address 42, a telephone number 43, a fax number 44, a mail address 45, a management F code 46, and an incoming contact priority order 47 are set. As regards the setting of a mail address, a new mail address is not added unless at least the name is input. As the management F code 46, a box number of the F code managed by the user whose name is set in the same mail address setting.

The user can perform setting input from a liquid crystal display provided in the operation/display section 24 or a key operation, or perform new addition, edition, and deletion of the F code setting and the mail address setting from application software installed in the PC 4 which controls the digital multifunction unit 1.

Figure 6A:
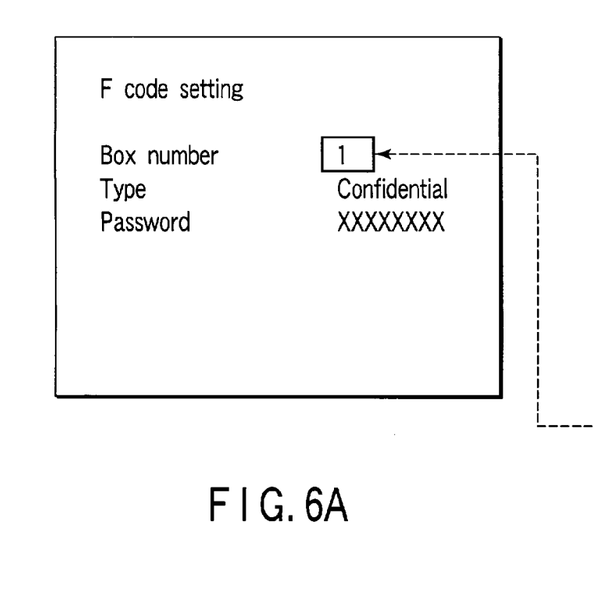
FIG. 6A and FIG. 6B show the relationship between an F code setting and a mail address.
Figure 6B:
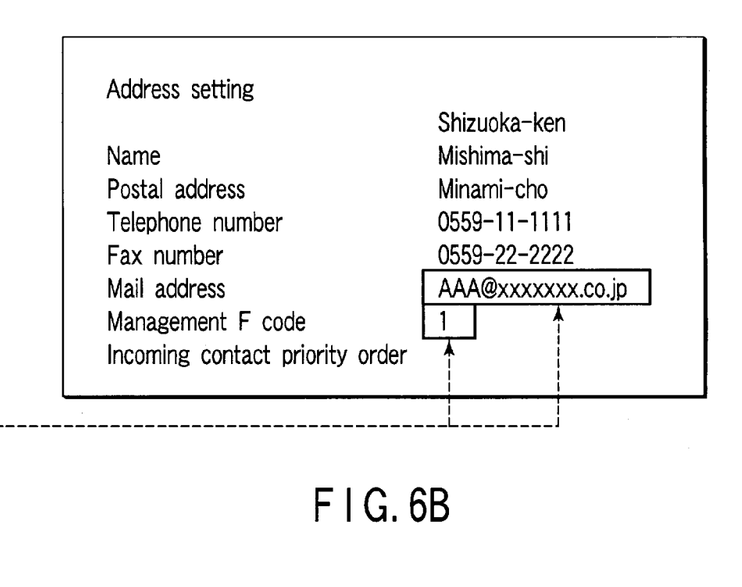

As shown in FIGS. 6A and 6B, the mail address with respect to which the F code box number is input in the management F code 46 is determined, and the F code having the box has actually been established, the F code box number is associated with the mail address.

The image storage section 15 comprises, for example, a mass-storage DRAM and a hard disk drive, and temporarily stores received facsimile data and facsimile data to be transmitted.

The coding/decoding section 16 performs coding processing on the facsimile data for redundancy compression, and decoding of the facsimile data subjected to the coding for redundancy compression.

The scanner section 17 performs reading of a document, if the document is placed on a document glass and a cover (not shown) is closed, and then a predetermined operation from the operation/display section 24 is received. The scanner section 17 then generates facsimile data corresponding to the document to be transmitted.

The printer section 18 prints an image corresponding to facsimile data on a printer sheet.

The modem 19 modulates facsimile data to produce a facsimile transmission signal, and modulates a command from the CPU 11 to produce a command transmission signal. The modem 19 sends these transmission signals to the PSTN 3 via the NCU 20. The modem 19 also demodulates the facsimile transmission data received via the NCU 20 from the PSTN 3 to reproduce facsimile data, and demodulates the command transmission signal to reproduce the command.

The NCU 20 is connected to the PSTN 3. The NCU 20 performs status monitoring or transmission processing to the network, concerning the connected PSTN 3. The NCU 20 performs equalizing the facsimile transmission signals to be transmitted to the PSTN 3 and level setting.

The telephone control section 21 is connected to an external telephone set, if necessary. The telephone control section 21 performs well-known control processing for enabling conversation via the PSTN 3 using the connected external telephone set.

The line signal detection section 22 receives a signal sent by the PSTN 3 via the NCU 20 and the telephone control section 21, thereby detecting incoming of a predetermined signal.

The LAN interface 23 is used for connection to the LAN 2.

The operation/display section 24 has an input section comprising a liquid crystal display or a plurality of keys for receiving various instruction inputs by the user to the CPU 11, and a display section for displaying various information items which should be reported to the user under control of the CPU 11.

The clock section 25 regularly counts time, and outputs present time information indicating the present time.

In the digital multifunction unit 1 having the above structure, as the control program stored in the ROM 12 which is executed by the CPU 11, a general program in a digital multifunction unit, a control program for creating an e-mail of a predetermined format, etc., are stored.

Figure 7:
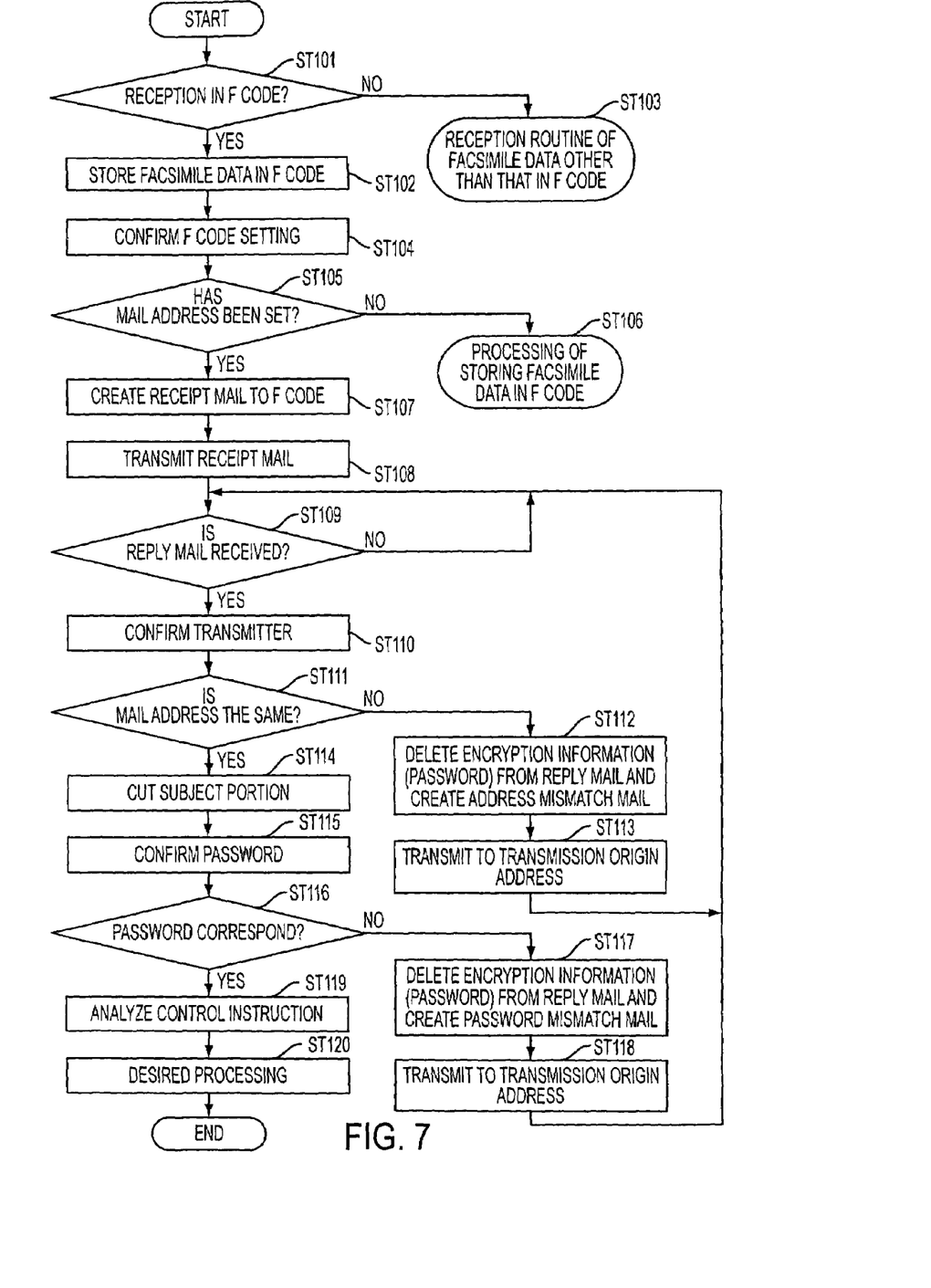
FIG. 7 is a flowchart of processing performed on reception of facsimile data.

FIG. 7 is a flowchart of processing performed by the CPU 11 on reception of facsimile data from the PSTN 3.

If the reception of facsimile data is detected, the CPU 11 determines whether or not the reception destination of the facsimile data is an F code which has already been established, in step ST101.

If it is determined that the facsimile data is received in an F code which has already been established, the CPU 11 stores the facsimile data into a desired F code, in step ST102. If it is determined that the facsimile data is not received in an F code which has already been established, the CPU 11 performs processing in the case of receiving facsimile data other than that received in the F code, in step ST103. For example, processing of executing facsimile data printing is performed. A file number is assigned to the received facsimile data in a memory, and this is a management number of the facsimile data.

If the facsimile data is stored in a desired F code, the CPU 11 confirms F code setting, in step ST104. Then, in step ST105, the CPU 11 determines whether or not the mail address associated with the F code is set. If the mail address is not set, the CPU 11 stores the facsimile data in a predetermined F code, in step ST106. If the mail address is set, the CPU 11 creates a receipt mail reporting to the mail address that the facsimile data has been received in the F code, in step ST107.

The creation of the receipt mail is finished, the CPU 11 transmits the receipt mail, in step ST108. In step ST109, the CPU 11 waits until a reply mail to the transmitted receipt mail is received.

On reception of the reply mail, the CPU 11 confirms the transmitter, in step ST110. In step ST111, the CPU 11 determines whether the mail address of the reply mail corresponds to the destination address of the receipt mail.

If it is determined that the mail addresses do not correspond, the CPU 11 creates an address mismatch mail indicating that the mail addresses do not correspond, in step ST112. In step ST113, the CPU 11 sends the address mismatch mail to the mail address of the transmission origin. Then the CPU 11 returns to the processing of waiting for the reply mail to be sent in step ST108.

If it is determined that the mail addresses correspond to each other, the CPU 11 performs cutting of the subject portion of the reply mail, in step ST114. Then, in step ST115, the CPU 11 confirms the password. In step ST116, the CPU 11 determines whether the passwords correspond to each other.

If it is determined that the passwords do not correspond, the CPU 11 creates a password mismatch mail indicating that the passwords do not correspond, in step ST117. The CPU 11 then sends the password mismatch mail to the mail address of the transmission origin, in step ST118. Then the CPU 11 returns to the processing of waiting for the reply mail to be sent in step ST108.

If it is determined that the passwords correspond, the control instruction is analyzed from the cut subject, in step ST119. In step ST120, the processing corresponding to the processing indicated by the control instruction is performed on the facsimile data stored in a desired F code. Then, the processing is finished.

Next, the operation of the digital multifunction unit 1 having the above structure will be explained.

If the reception destination of the facsimile data sent by the PSTN 3 is an F code which has been established, the digital multifunction unit 1 stores the facsimile data into a desired F code. If the F code of the reception destination is associated with the mail address, the digital multifunction unit 1 creates a receipt mail and sends the receipt mail to that mail address.

Figure 8:
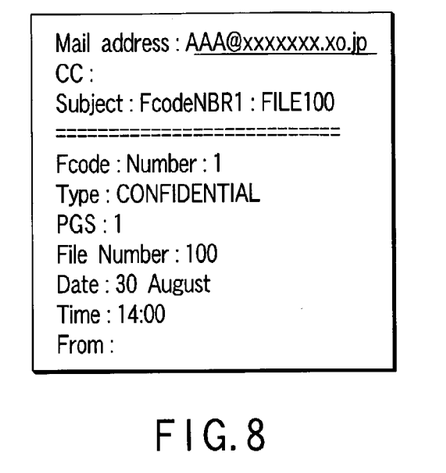
FIG. 8 shows an example of a receipt mail.

FIG. 8 shows an example of the receipt mail displayed on the monitor of the PC 4 when the receipt mail is opened with a mail client application of the PC 4. As the subject, the box number of the receiving F code and the file number are indicated with "half-width" alphanumeric characters. In the body of the receipt mail, the box number of the F code, type, number of pages, file number, and the reception date are indicated with "half-width" alphanumeric characters. These contents are information creatable by the digital multifunction unit 1 which has received the facsimile data.

Therefore, the user to which the receipt mail is sent from the digital multifunction unit 1 can know the reception of the facsimile data in the F code which is registered to be managed by the user himself/herself.

Figure 9:
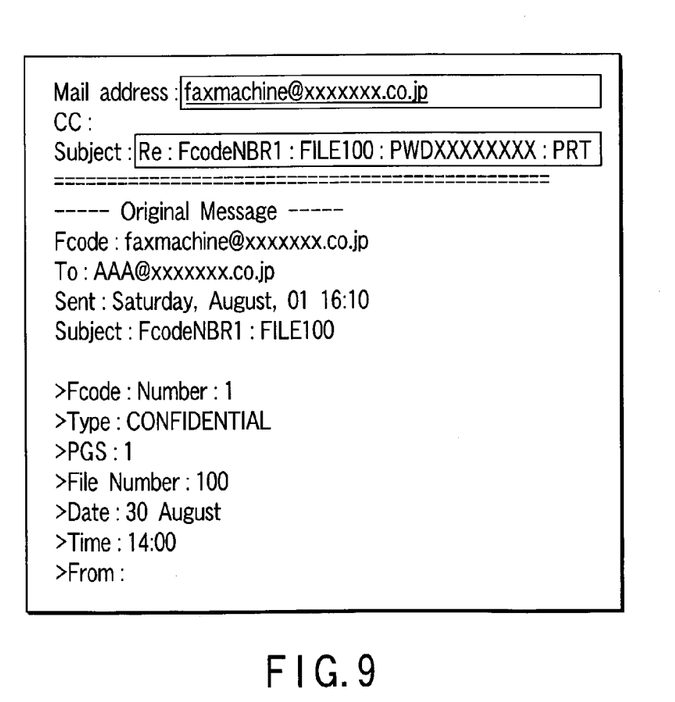
FIG. 9 shows an example of a reply mail.

The user then clicks on a reply button on the mail client application, and the edit display of the reply mail is shown on the monitor of the PC 4. FIG. 9 shows an example of the reply mail displayed on the monitor. The subject of the receipt mail is used as the subject of the reply mail. An instruction for remote-controlling the digital multifunction unit 1 is added to this subject. With respect to the contents of the added instruction, a password and a control instruction, for example, are indicated with "half-width" alphanumeric characters. With respect to the password, the password which is the same as that set at the time of creating a box in setting the F code is added after the command indicated by "PWD". With respect to the control instruction, the processing on the facsimile data received in the F code is replaced with a control instruction of three characters and this is indicated.

Figure 10:
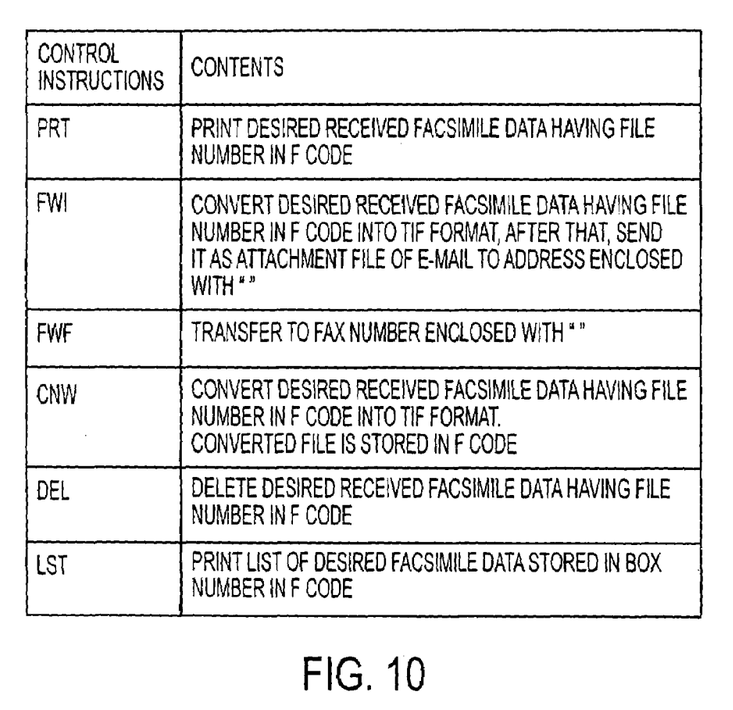
FIG. 10 is a table showing control instructions replaced with three characters.

The control instructions are, for example, "PRT", "FWI", "FWF", "CNW", "DEL", and "LST". The "PRT" is a control instruction for printing desired received facsimile data having the file number in the F code. The "FWI" is a control instruction for converting desired received facsimile data having the file number in the F code into the TIF format, and after that, sending it, as an attachment file of an e-mail, to the mail address enclosed with " " following this command. The "FWF" is a control instruction for transferring the facsimile data to the fax number enclosed with following this command. The "CNW" is a control instruction for converting desired received facsimile data having the file number in the F code into the TIF format, and storing the converted file in the F code. The "DEL" is a control instruction for deleting desired received facsimile data having the file number in the F code. The "LST" is a control instruction for printing the list of desired facsimile data stored in the file number in the designated F code.

The user clicks on a transmission button to send a reply mail to the digital multifunction unit 1, after specifying the password and the control instruction. By sending such a reply mail to the digital multifunction unit 1, the received facsimile data in the F code can be processed remotely.

The digital multifunction unit 1 which has received a reply mail analyzes the subject of the received reply mail.

Specifically, the digital multifunction unit 1 searches "subject" from the field name of the header information created by the mail client application of the PC4 and added to the body of the mail. The "subject" field indicates the subject. After the "subject" field received by the digital multifunction unit 1, the box number of the F code, file number, password, and control command are indicated. Only if it is determined that the password indicated in the reply mail corresponds to a desired box number, the digital multifunction unit 1 executes a control instruction to perform processing on the received facsimile data.

Therefore, no one except the person who manages the box number of the F code is informed that the facsimile data has been stored in the F code box. Further, the processing of the facsimile data cannot be remotely performed. Thus, the digital multifunction unit 1 can hold confidentiality.

A person who manages the F code box can immediately know that the F code managed by himself/herself has received facsimile data, and can perform processing, which he/she has selected, on the facsimile data. The convenience of the digital multifunction unit 1 can be improved.

No control instruction is executed if the contents of the subject of the received reply mail include a tampered format which causes unnecessary information to appear, or the input of the control instruction is incorrect.

In the above embodiment, the present invention is explained for the case where the indication of the contents of the subject is based on "half-width" alphanumeric characters. However, the present invention is not limited to this. For example, under a computer environment using the Japanese language, there are "half-width" characters indicated with 1 byte, and "full-width" characters indicated with 2 bytes. In such a case, encoding or decoding of characters is performed at both transmission and reception sides. Therefore, if the received mail is encoded, the contents following the "subject" are decoded and then the box number of the F code, file number, password, and control instruction are extracted.

In the above embodiment, the present invention is explained for the case where the facsimile data is sent from the PSTN 3. However, the present invention is not limited to this. The F code can be set in an Internet facsimile via the Internet. Thus, the present invention can be applied to the case where the facsimile data received by the Internet facsimile is stored in the F code.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus, comprising:
   a setting section which sets an F code indicating a location in which facsimile data received from outside is stored, and a mail address of a computer apparatus connected to a network, associated with the F code;
   a receiving section which receives the facsimile data along with the F code;
   a receipt mail creating section which creates, if the facsimile data is received along with the F code, a receipt mail reporting to the mail address associated with the F code that the facsimile data has been received;
   a processing section which, if a mail including instructions concerning processing on the received facsimile data is accepted with respect to the receipt mail, processes the facsimile data in accordance with the instructions, wherein the mail including the instructions is a reply mail to the receipt mail; and
   a determining section which receives encryption information preset in association with the mail address along with the reply mail, and determines from the received encryption information whether processing on the facsimile data is performed,
   wherein if the determining section determines that the processing on the facsimile data is not performed, the determining section deletes the encryption information of the received reply mail and sends the reply mail to a transmission origin.

2. The image processing apparatus according to claim 1, wherein a transmitter of the reply mail is confirmed.

3. The image processing apparatus according to claim 1, wherein the determining section determines whether a mail address of the reply mail corresponds to a destination address of the receipt mail.

4. The image processing apparatus according to claim 3, wherein when the mail address of the reply mail is different from the destination address of the receipt mail, an address mismatch is created and sent to a mail address of the transmission origin.

5. The image processing apparatus according to claim 1, wherein the determining section determines whether the contents of a subject field of the received reply mail has been altered.

6. The image processing apparatus according to claim 1, wherein the determining section determines whether an input control instruction is incorrect.

7. An image processing method, comprising:
   receiving facsimile data along with an F code indicating a location in which facsimile data received from outside is stored;
   creating, if the facsimile data is received along with the F code, a receipt mail reporting to the mail address associated with the F code that the facsimile data has been received;
   accepting a mail including instructions concerning processing on the facsimile data with respect to the receipt mail, wherein the mail including the instructions is a reply mail to the receipt mail;
   processing the facsimile data in accordance with the instructions;
   receiving encryption information preset in association with the mail address along with the reply mail; and
   determining from the received encryption information whether processing on the facsimile data is performed,
   wherein if it is determined that the processing on the facsimile data is not performed, the encryption information of the reply mail is deleted and the reply mail is sent to a transmission origin.

8. The image processing method according to claim 7, further comprising confirming a transmitter of the reply mail.

9. The image processing method according to claim 7, further comprising determining whether a mail address of the reply mail corresponds to a destination address of the receipt mail.

10. The image processing method according to claim 9, further comprising creating an address mismatch and sending the address mismatch to a mail address of the transmission origin when the mail address of the reply mail is different from the destination address of the receipt mail.

11. The image processing method according to claim 7, further comprising determining whether the contents of a subject field of the received reply mail has been altered.

12. The image processing method according to claim 7, further comprising determining whether an input control instruction is incorrect.

13. An image processing apparatus, comprising:

means for setting an F code indicating a location in which facsimile data received from outside is stored and a mail address of a computer apparatus connected to a network associated with the F code;

means for receiving the facsimile data along with the F code;

means for creating, if the facsimile data is received along with the F code, a receipt mail reporting to the mail address associated with the F code that the facsimile data has been received;

means for processing, if a mail including instructions concerning processing on the received facsimile data is accepted with respect to the receipt mail, the facsimile data in accordance with the instructions, wherein the mail including the instructions is a reply mail to the receipt mail; and means for determining whether processing on the facsimile data is performed based on received encryption information preset in association with the mail address along with the reply mail, wherein if the means for determining determines that the processing on the facsimile data is not performed, the means for determining deletes the encryption information of the received reply mail and sends the reply mail to a transmission origin.

14. The image processing apparatus according to claim 13, wherein a transmitter of the reply mail is confirmed.

15. The image processing apparatus according to claim 13, wherein the means for determining determines whether a mail address of the reply mail corresponds to a destination address of the receipt mail.

16. The image processing apparatus according to claim 15, wherein when the mail address of the reply mail is different from the destination address of the receipt mail, an address mismatch is created and sent to a mail address of the transmission origin.

17. The image processing apparatus according to claim 13, wherein the means for determining determines whether the contents of a subject field of the received reply mail has been altered.

18. The image processing apparatus according to claim 13, wherein the means for determining determines whether an input control instruction is incorrect.

* * * * *